July 5, 1932. J. P. CLINGINGSMITH ET AL 1,865,886
AUTOMATIC VALVE
Filed July 31, 1929 2 Sheets-Sheet 1

INVENTOR
J. P. Clingingsmith
BY A. J. Smith
Jack A Schley
ATTORNEY

July 5, 1932. J. P. CLINGINGSMITH ET AL 1,865,886
AUTOMATIC VALVE
Filed July 31, 1929   2 Sheets-Sheet 2

INVENTOR
J. P. Clingingsmith
A. J. Smith
BY
Jacha Schley
ATTORNEY

Patented July 5, 1932

1,865,886

UNITED STATES PATENT OFFICE

JAMES P. CLINGINGSMITH AND ARTHUR J. SMITH, OF NOCONA, TEXAS

AUTOMATIC VALVE

Application filed July 31, 1929. Serial No. 382,486.

This invention relates to new and useful improvements in automatic valves.

One object of the invention is to provide a valve connected in the supply line to a storage tank and arranged so that when the liquid in said tank has reached a pre-determined level, said valve will be automatically closed and the supply of liquid by-passed to another tank or otherwise disposed of, thus avoiding overflowing the tank.

Another object of the invention is to provide a self-closing valve normally locked open and provided with a float actuated trip, whereby said valve is released and permitted to close itself when the float reaches a certain height.

A further object of the invention is to provide the valve with means for conveniently opening it and resetting the locking means.

A construction designed to carry out the invention will be hereinafter described together with other features of the invention.

The invention will be more readily understood from a reading of the following specification and by reference to the accompanying drawings, in which an example of the invention is shown, and wherein.

Figure 1:
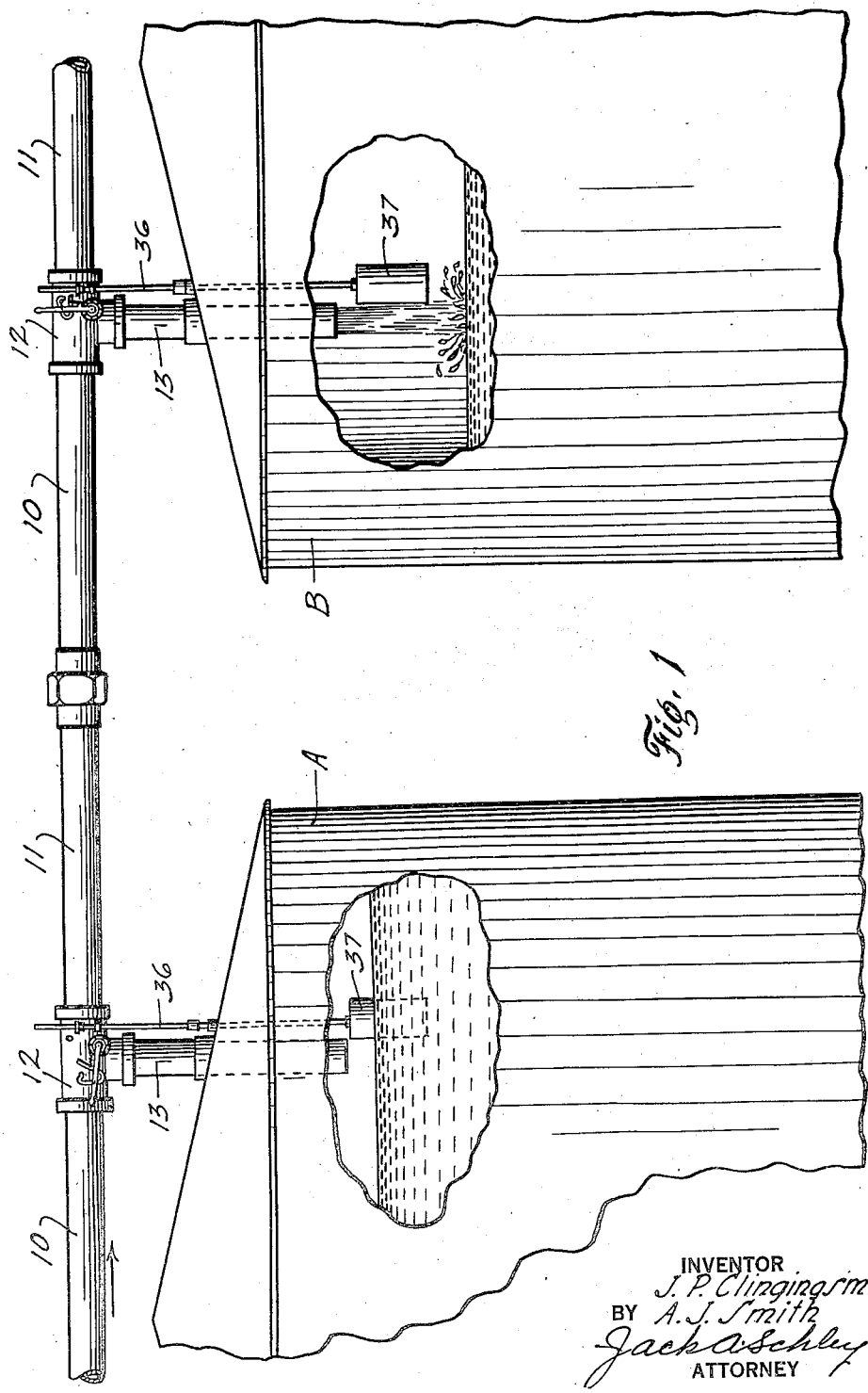
Figure 1 is a view showing valves constructed in accordance with the invention connected to a pair of storage tanks, one of said valves being closed and the other open.

In the drawings the numeral 10 designates a liquid supply pipe which is connected in one side of a T-shaped valve case 12 having a by-pass pipe 11 connected in its opposite side. A discharge pipe 13 leads from the bottom of the case.

In Figure 1, one of the discharge pipes 13 depends through the roof of a storage tank A, while the other discharge pipe extends through the roof of a tank B. The by-pass nipple 14 of the case and also the discharge nipple 15 are internally screw threaded, whereby valve seat rings 16 and 17 respectively may be screwed thereinto and replaced when worn.

Figure 3:
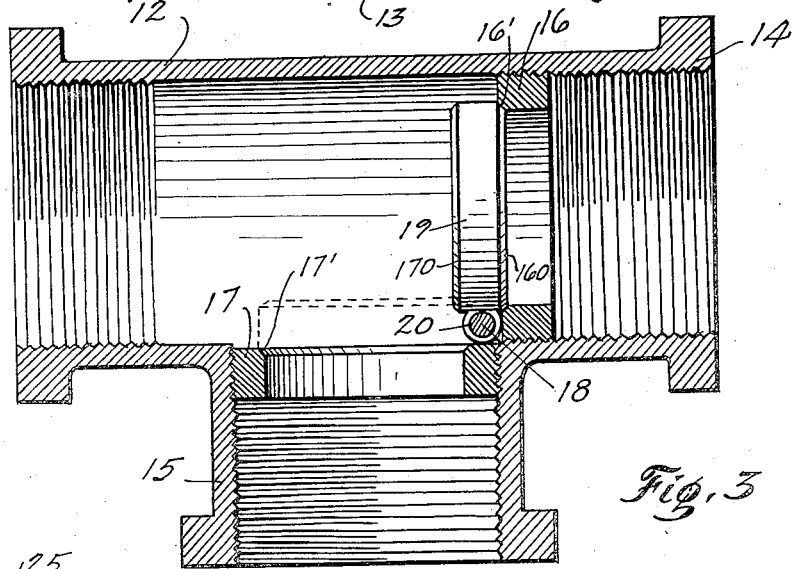
Figure 3 is a vertical sectional view of the same.
Figure 4:
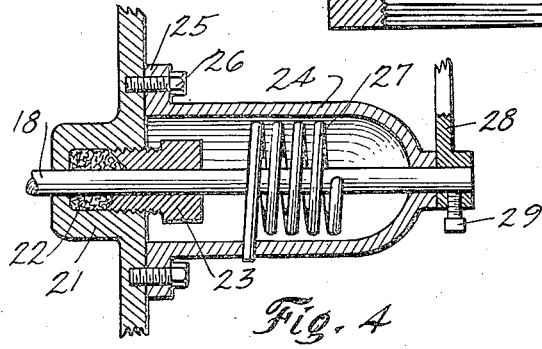
Figure 4 is a sectional view of the valve closing motor.

A rock shaft 18 extends transversely through the case at the intersections of the nipples 14 and 15. A valve 19 is fastened on said shaft by means of ears 20. The ring 16 has a bevelled seat 16' and the ring 17 has a similar seat 17'. The valve has double bevels 160 and 170, respectively. When the valve 19 is swung upward to its open position shown in full lines in Figure 3, the bevel 160 will engage the seat 16' and when it is lowered to its closed position, as is shown in dotted lines, the bevel 170 will engage the seat 17'. The valve will thus effectively seat in either its open or its closed position.

The valve rock shaft 18 extends through a stuffing box 21 formed in the case 12. A suitable packing 22 surrounds the shaft and is compressed by a follower 23. A motor housing 24 covers the follower and has a circular flange 25 receiving screws 26 whereby it is secured to the valve case.

The shaft extends through the housing. One end of a coiled spring within the housing is secured to the shaft and the other end is fastened to the housing. This spring is under torsional tension when the valve is in its open or upright position (Figure 3) so that when the valve is released the spring motor will swing the valve down to its closed position.

On the outer end of the shaft 18 beyond the housing a hand lever 28 is fastened by a set screw 29 and by swinging this lever the shaft is rocked. A yoke shaped latch 30 is pivoted on the lever and has its hook 31 engaging over a pin 32 extending from the side of the valve case, whereby the valve 19 is held in an open position. A tension spring 33 extends from an ear 35 on the lever to the arm 34 of the latch.

A tripping rod 36 is mounted to slide vertically through the roof of the storage tank and has a float 37 attached to its lower end. This rod may be made in sections and connected by a nipple 38 so that its length may be changed by substituting other sections. The upper portion of the rod may be graduated in feet and inches if desired.

A collar 39 is adjustably fastened on the rod by a set screw 40. The collar has an outwardly directed annular flange 41 and the arm 34 of the latch 30 extends into the path of the flange.

Figure 2:
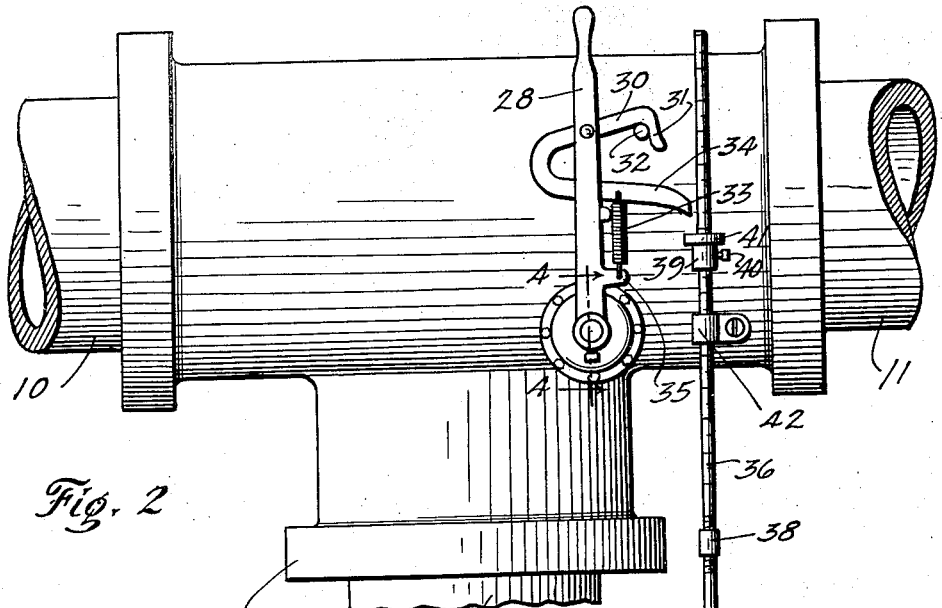
Figure 2 is a side elevation of one of the valves.

Normally the parts are in the positions shown in full lines in Figures 1 and 2, whereby liquid flowing through the pipe 10 is diverted by the upright valve 19 into the nipple 15 and discharged through the pipe 13 into the tank A. When the tank is empty the collar 39 will rest upon a guide bracket 42 and as the liquid level in the tank approaches the top the float 37 will be immersed.

When the liquid reaches its maximum level the float will elevate the rod 36 so that the flange 41 will engage the arm 34 and trip the latch 30. The tripping of the latch will lift the hook 31 from the pin 32, thus permitting the spring motor 27 to rock the shaft 18.

When the shaft is rocked the valve 19 will be swung onto the seat 17' and closed, whereby the liquid will be by-passed through the pipe 11 to the pipe 10 of the next tank. By swinging the hand lever 28 upwardly the valve may be opened and the latch reset.

Various changes in the size and shape of the different parts, as well as modifications and alterations, may be made within the scope of the appended claims.

What we claim, is:

1. In an automatic valve, a valve case, a valve hinged in the case and normally open, a spring motor connected with the hinge of the valve and acting to close the same, a lever connected with the hinge of the valve and carrying a latch, said latch being engaged to hold the valve open and the spring motor under restraint, a vertically movable rod mounted on the valve case and having a projection for engaging and tripping the latch to release the lever and motor to close the valve, and a float connected with the rod.

2. In an automatic valve, a valve case having a by-pass discharge opening and a liquid discharge opening at an angle to the by-pass discharge opening, a valve hinged in the case and having a shaft extending from the case, a spring motor attached to the shaft for rotating it to swing the valve from one opening to the other, and a latch for holding the motor in restraint and also for holding the valve closed at one of the openings.

3. An automatic valve as set forth in claim 2, with float operated means for tripping the latch.

In testimony whereof we affix our signatures.

JAMES P. CLINGINGSMITH.
ARTHUR J. SMITH.